United States Patent [19]

Schonlau et al.

[11] Patent Number: 4,840,433

[45] Date of Patent: Jun. 20, 1989

[54] PRESSURE CONTROL DEVICE, IN PARTICULAR FOR PRESSURE-FLUID-OPERABLE BRAKE SYSTEMS OF AUTOMOTIVE VEHICLES

[75] Inventors: Juergen Schonlau, Walluf; Alfred Birkenbach, Hattersheim; Ralf Harth, Oberursel, all of Fed. Rep. of Germany

[73] Assignee: Alfred Teves GmbH, Frankfurt am Main, Fed. Rep. of Germany

[21] Appl. No.: 169,562

[22] Filed: Mar. 17, 1988

[30] Foreign Application Priority Data

Mar. 26, 1987 [DE] Fed. Rep. of Germany ....... 3709991

[51] Int. Cl.$^4$ .......................... B60T 8/24; B60T 8/26; B60T 8/28; G05D 16/10
[52] U.S. Cl. .................................. 303/9.68; 188/349; 303/9.75; 303/24.1
[58] Field of Search .................. 303/9.67, 9.68, 24.1, 303/6.01, 9.66, 9.69, 9.71, 9.72, 9.73, 9.74, 9.75; 188/349

[56] References Cited

U.S. PATENT DOCUMENTS

| | | | |
|---|---|---|---|
| 3,377,108 | 4/1968 | Eddy | 188/349 X |
| 3,825,303 | 7/1974 | Yabuta | 303/9.68 |
| 3,922,020 | 11/1975 | Koike et al. | 303/9.67 |
| 3,944,293 | 3/1976 | Ishigami et al. | 303/24 F |
| 4,093,314 | 6/1978 | Kozabai | 303/9.68 |
| 4,113,318 | 9/1978 | Doi | 303/9.68 |
| 4,196,937 | 4/1980 | Falk | 303/9.68 |
| 4,205,883 | 6/1980 | Gaiser | 303/9.68 |
| 4,387,932 | 6/1983 | Shellhause | 303/9.68 |
| 4,614,381 | 9/1986 | Riquart et al. | 303/9.68 |
| 4,652,058 | 3/1987 | Runkle et al. | 303/9.68 |
| 4,679,864 | 7/1987 | Myers et al. | 303/9.67 |
| 4,718,734 | 1/1988 | Gaiser | 303/24.1 |
| 4,736,989 | 4/1988 | Myers et al. | 303/24.1 |
| 4,770,471 | 9/1988 | Gaiser | 303/24.1 |

FOREIGN PATENT DOCUMENTS

| | | |
|---|---|---|
| 0165858 | 12/1985 | European Pat. Off. . |
| 0175089 | 3/1986 | European Pat. Off. . |
| 0202457 | 11/1986 | European Pat. Off. . |
| 0223054 | 5/1987 | European Pat. Off. . |
| 0245615 | 11/1987 | European Pat. Off. . |
| 3100916 | 12/1981 | Fed. Rep. of Germany . |
| 0057549 | 5/1981 | Japan ................... 303/9.67 |

*Primary Examiner*—Douglas C. Butler
*Attorney, Agent, or Firm*—James B. Raden

[57] ABSTRACT

Disclosed is a pressure control device including a housing incorporating a pressure control valve which governs a connection between a pressure-fluid inlet and a pressure-fluid outlet. Included is a deceleration-responsively movable inertia member, and control piston arranged in the housing and being slidable in dependence upon the pressure of the pressure fluid and the position of the inertia member and acting upon the pressure control valve. In order to provide for a pressure control device which is more cost-efficient and which switches precisely irrespective of the viscosity and the flow velocity of the pressure fluid, the inertia member is arranged in a chamber of the pressure control device which is substantially free from pressure fluid and the inertia member controls a valve which isolates a compartment confined by the housing and the control pisotn from the chamber.

5 Claims, 3 Drawing Sheets

PRESSURE CONTROL DEVICE, IN PARTICULAR FOR PRESSURE-FLUID-OPERABLE BRAKE SYSTEMS OF AUTOMOTIVE VEHICLES

BACKGROUND OF THE INVENTION

The present invention relates to a pressure control device and in particular for use in a pressure-fluid-operable brake system of an automotive vehicle.

Such pressure control devices are mounted between a master cylinder and a rear-wheel brake in a pressure-fluid-operable brake system of the automotive vehicle for the purpose of controlling brake force of the rear wheels by distributing the brake forces between the front and the rear axle deceleration-responsively and approximating an ideal distribution characteristic curve.

A pressure control device of this type is disclosed in the German published patent application No. 31 00 916 A1. In the pressure controller disclosed therein, the operating piston is acted upon by the inlet pressure by way of a spring and an intermediate piston. The communication between the pressure-fluid inlet and the intermediate piston is interrupted by an inertia member in the presence of a predefined deceleration. Starting from this point of time, the operating piston is displaced in opposition to the force of the spring, while the intermediate piston which has a larger cross-sectional surface than the operating piston maintains the position it last assumed.

A disadvantage of this known pressure control device is that the operating point of the inertia member is adversely effected by the influence of the viscosity and the flow velocity of the pressure fluid. In order to avoid such effects, it has been proposed in the British patent GB 2 106 205 A to provide a solenoid valve operated by an electric G-sensor. However, such design entails high costs.

SUMMARY OF THE INVENTION

Therefore, it is an object of the present invention to provide for a pressure control device which is cost effective to manufacture and which overcomes the above-mentioned drawbacks.

An embodiment of this invention which is particularly advantageous in terms of manufacturing and assembling costs resides in that the guide of the inertia member comprises several ribs having differing angles of inclination relative to the horizontal plane.

In order to allow the inertia member to actuate the valve, that it acts upon as quickly as possible, it is provided that, subsequent to the areas including the angles of inclination, the guide of the inertia member comprises additional areas having appreciably smaller angles of inclination. Accordingly, the inertia member will immediately, upon its being unseated due to the deceleration force, roll over the tilting point and, due to the force altering effects of the angles, will move out of the previously existing balance of forces. As a result, the inertia member falls sideways very fast, and the applied valve is able to switch very rapidly.

Because the angle of inclination between the guide of the inertia member and the vehicle's transverse axis is less than that between the guide and the vehicle's longitudinal axis, reduction of the change-over pressure when the vehicle is cornering is also achieved.

A throttle in the compartment confined by the control piston permits the control piston's speed to be optimized.

When using one pressure control unit for each rear-wheel brake, the change-over pressure for one wheel can be set different from that for the other wheel and by correspondingly arranging the angle of inclination of the valves.

BRIEF DESCRIPTION OF THE DRAWING

Further favorable features as well as the function of the inventive pressure control device will become apparent from the following Detailed Description of the Preferred Embodiment and the accompanying drawings in which.

DETAILED DESCRIPTION OF A PREFERRED EMBODIMENT

Figure 1:
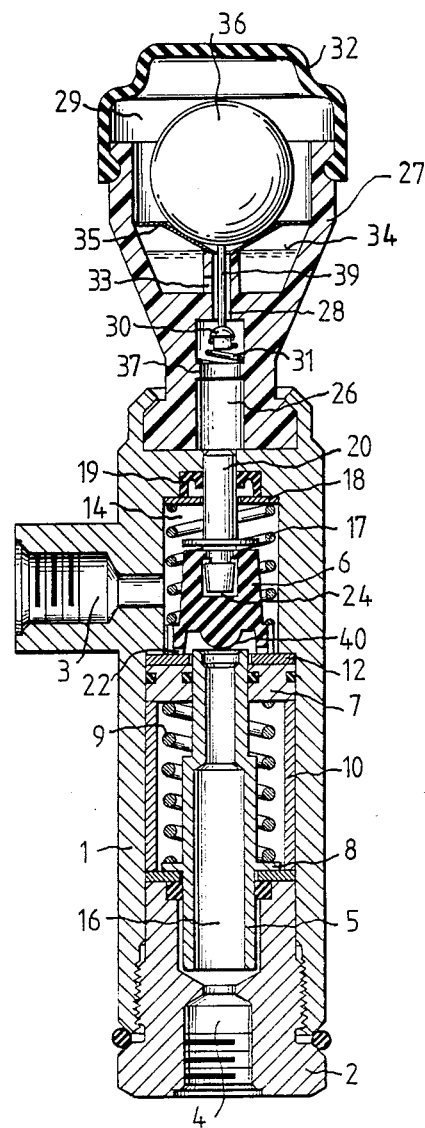
FIG. 1 is a cross-section taken through a valve according to the invention showing details of construction.

A pressure control device is shown in FIG. 1 including a housing 1 incorporating a stepped axial bore accommodating the pressure control valve 5, 6 held by a screw coupling 2. The pressure control valve comprises an axially slidable operating piston 5 which is supported with its one end in the screw coupling 2, while its other end is supported sealedly in a guide sleeve 7. The operating piston 5 is designed as a stepped hollow cylinder whose larger diameter faces the outlet 4 provided in the screw coupling 2. The operating piston 5 includes a step 8 on which a control spring 9 acts and which serves as an abutment surface for a stop formed fast with the housing. The control spring 9 bears with its other end against the guide sleeve 7 which, by means of a spacer sleeve 10, is retained against a step of the axial bore of the housing 1 through a washer 12 by the screw coupling 2. A channel 16 extends axailly through the operating piston 5 and connects the outlet 4 to an inlet chamber 14 with which a connecting bore for the inlet 3 connects.

Arranged in the inlet chamber 14 is the axially slidable valve seat 6 which is loaded by a compression spring 17 and abuts on the washer 12. The other end of the compression spring 17 bears against a washer 18 which axially retains a groove ring seal 19 which seals the control piston 20 relative to the housing 1.

The valve seat 6 includes ducts 22 at its end adjacent to the washer 12. On its opposite end, the valve seat includes a recess 24 in which the control piston 20 is received. To this end, the control piston 20 includes a circumferential groove, and the recess has a radial stepped contraction.

The opposite end of the control piston 20 projects through the groove ring 19 into a compartment 26 which communicates through a bore 28 with a chamber 29. The compartment 26 and the chamber 29 are disposed in a head portion 27 which is made from plastic and one end of which is pressure-tightly sealed with the housing 1, while the other end thereof is closed by a closing cap 32.

The compartment 26, the bore 28 as well as the chamber 29 are filled with hydraulic fluid to a specific level 34. Below this fluid level, the chamber 29 communicates through radial flow ducts 33 with the bore 28. Above the fluid level is a guide element 35 of an inertia member 36 which is designed as a ball. The quantity of hydraulic fluid is sized such that the inertia member 36 is always disposed in the area of the chamber 29, which area is free from pressure fluid.

In its seated position, the inertia member 36 acts upon a tappet 39 of a valve closure member 30 in opposition to the force of the valve spring 31 acting in the opening direction. The valve spring 31 takes support on a step of the valve closure member 30, on the one hand, and on a projection 37 provided in compartment 26, on the other hand.

Figure 3:
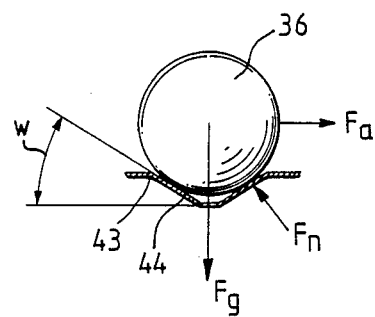
FIGS. 3 and 4 are schematic illustrations of the inertia member on its guide along the vehicle's longitudinal axis showing the inertia member in different positions and the effective forces acting on the inertia member.
Figure 2:
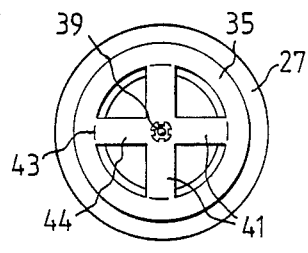
FIG. 2 is the top view of the guide element of the inertia member in the valve of FIG. 1.
Figure 5:
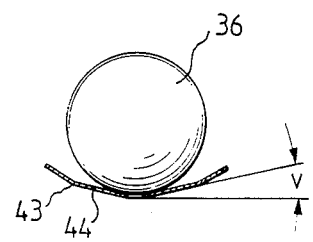
FIG. 5 is an illustration of the inertia member and its guide according to a cross-section taken along the vehicle's transverse axis.

FIG. 2 shows the guide element 35 on the inertia member 36 which is designed as a circular sheet-metal part. Cruciformly extending ribs 41 have different angles of inclination w and v in the vehicle's longitudinal direction and the vehicle's transverse direction as shown in FIG. 3 and FIG. 5. The tappet 39 is guided in the radial direction in a central recess in the guide element 35.

When in its unactuated condition, the pressure control device assumes the position shown in FIG. 1. Upon commencement of brake application, the pressure introduced by the (non-illustrated) master cylinder into the ilet chamber 14 is applied through the ducts 22 and the channel 16 in the operating piston 5 unreduced at the outlet 4, to which the (non-illustrated) rear-wheel brakes are connected. Upon further rise of the inlet pressure, the operating piston 5 will displace in the direction of the inlet chamber 14 beginning from a magnitude of pressure which is determined by the pressurized surfaces at the operating piston 5 and by the control spring 9. The pressure in the inlet chamber 14, simultaneously, causes the control piston 20 which is connected to the valve seat 6 to displace in opposition to the force of the compression spring 17 into the compartment 26, as a result thereof fluid from the compartment 26 is displaced through the bore 28 and the ducts 33 into the chamber 29.

The pressurized surfaces on the operating piston 5 and on the control piston 20 as well as the rigidity of the compression spring 17 and the control spring 9 are rated such that, during this unidirectional movement of the operating piston 5 and the valve seat 6, the hemispherical seal portion 40 on valve seat 6 is not allowed to abut on its mating surface on the operating piston 5. The connection between the inlet chamber 14 and the outlet 4 is thus maintained.

Under the influence of a predefined deceleration value of the automotive vehicle, the inertia member 36 becomes unseated from its normal position, as a result whereof the load application on the tappet 39 of the valve closure member 30 is interrupted. Under the action of the force of the valve spring 31, the valve closure member 30 closes the connection between the chamber 29 and the compartment 26.

From this point of time onward, the control piston 20 and thus the valve seat 6 will remain in the position they last assumed while, on further pressure rise in the inlet chamber 14, the operating piston 5 will continue to move in opposition to the force of the control spring 9 into the inlet chamber 14, until it abuts on the sealing port 40 of the valve seat 6 and the passage from the inlet chamber 14 to the outlet 4 is closed.

Figure 4:
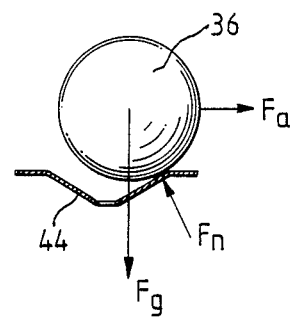

Upon further pressure rise in the inlet chamber 14, the operating piston 5 moves back and forth in rapid sequence, and in doing so, opens and closes the pasage at the valve seat 6. During this action, the pressure in the outlet 4 is reduced in relation to the pressure in the inlet chamber 14 corresponding to the ratio of the pressurized surfaces on the operating piston 5. In order to obtain a precise, reproducible deceleration-responsive change-over pressure, the valve 30, 31 must switch as quickly as possible. For this reason, as shown in FIGS. 3 and 4, the guide element 35 is provided with a knee 43 between the differing angles of inclination. Thus, the inertia member 36 is permitted to tilt about the knee 43 after it is deceleration-responsively unseated and, due to a reaction force $F_n$ which changes with the angle of inclination, the balance of forces is upset, in consequence whereof the inertia member releases the tappet 39 very quickly. $F_g$ and $F_a$ designate the weight force and acceleration force at the inertia member 36. FIG. 3 shows the force acting on the inertia member 36 prior to its being unseated and FIG. 4 shows the forces when the ball rolls over the knee 43.

FIG. 5 shows a cross-section taken along the vehicle's transverse axis. It can be seen from this Figure that the angle of inclination v effective during transverse acceleration, that is when the vehicle is cornering, is distinctly less than the angle of inclination w effective during longitudinal decelerations. That is to say, during transverse accelerations, a smaller acceleration value is required to unseat the inertia member 36 than during decelerations in the vehicle's longitudinal direction.

Figure 6:
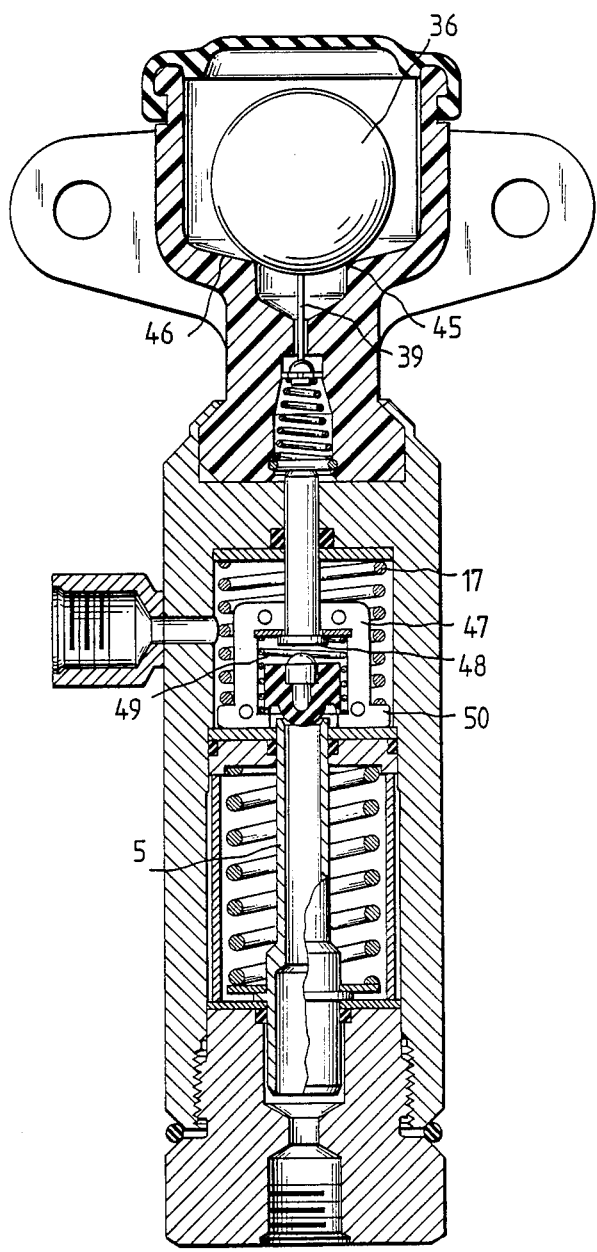
FIG. 6 is a cross-section through an alternative embodiment of this invention showing details of construction.

FIG. 6 shows an axial cross-section through an alterative embodiment of the invention which differs from FIG. 1 substantially only in the head portion 27 and in the guidance of the valve seat 6.

In this embodiment, the guidance of the inertia member 36 is provided for in the head portion 27, what obviates the need for an additional guide element 35 as in the embodiment of FIG. 1, In its inactive condition, the inertia member 36 in the embodiment of FIG. 6 abuts on the guide line 45, over which it rolls and thereby releases the tappet 39 at a specific deceleration value determined by the mass of the inertia member and the course of the guide line 45.

The guide line 45 is defined by a line of intersection of a horizontal cylinder, that is a cylinder whose vertical axis of plane is disposed in the radial plane of the pressure control device, and of a ball, i.e., in this case a spherical bowl 46.

This ellipse-shaped guide line which is also curved in an axial direction causes the inertia member to become unseated during decelerations in the direction of the shorter ellipse axis in the presence of lesser deceleration values than during deceleration in the direction of the longer axis. Therefore, the pressure control device is aligned in the vehicle such that the principal longitudinal axis is coincident with the vehicle's longitudinal axis.

In some applications it may be come necessary to mount a (non-illustrated) throttle in the compartment 26.

To exactly guide the control piston 20 and the valve seat 6, there is provided a two-part bell-shaped guide housing 47. Two guide housing halves are riveted together after the flange-like expanded end 48 of the control piston 20, on the one hand, the valve seat 6, on the other hand, have been inserted into one housing half and the other half has been mated thereto.

The compression spring 17 preloading the control piston takes support on a flange 50 of the guide housing 47. The valve seat 6 which is supported axially slidably supported in the guide housing is biased by the spring 49 in the direction of the operating piston 5, and the spring 49 bears against the guide housing 47.

What is claimed is:

1. A pressure control device for pressure-fluid-operable brake systems of automotive vehicles, comprising a housing having a longitudinal axis extending in a vertical direction and said housing incorporating a pressure control valve adapted to control pressure fluid flow between a pressure-fluid inlet and a pressure-fluid outlet of said housing, a deceleration-responsively movable inertia member in said housing, a control piston arranged in the housing, said control piston being slidable in dependence upon the pressure of the pressure fluid and the position of the inertia member, said control piston operatively connected to the pressure control valve, wherein the inertia member is provided in a chamber in the housing, said chamber being substantially free from pressure fluid, a guide element in said chamber for guiding said inertia member in a horizontal movement direction in response to deceleration forces on said inertia member the inertia member adapted to control a second valve which is mounted and operative to isolate a compartment, confined by the housing and a face of the control piston, from the chamber, said second valve connecting said chamber and said compartment wherein the record valve closes the connection between said chamber and said compartment when said inertia member is moved into said horizontal direction thereby to constrain said control piston to a fixed position relative to said compartment.

2. The pressure control device as claimed in claim 1 wherein said guide element includes a plurality of ribs having differing angles of inclination relative to a horizontal plane.

3. The pressure control device as claimed in claim 2 wherein the guide element further includes areas having angles of inclination substantially smaller than those of said ribs.

4. The pressure control device as claimed in claim 3 wherein a point of transition from the areas with larger angles of inclination to the areas with smaller angles of inclination on said guide element is in the form of a knee.

5. The pressure control device as claimed in claim 4 wherein the angle of inclination relative to the transverse axis of the vehicle is less than the angle of inclination relative to the vehicle's longitudinal axis.

* * * * *